Patented Aug. 16, 1949

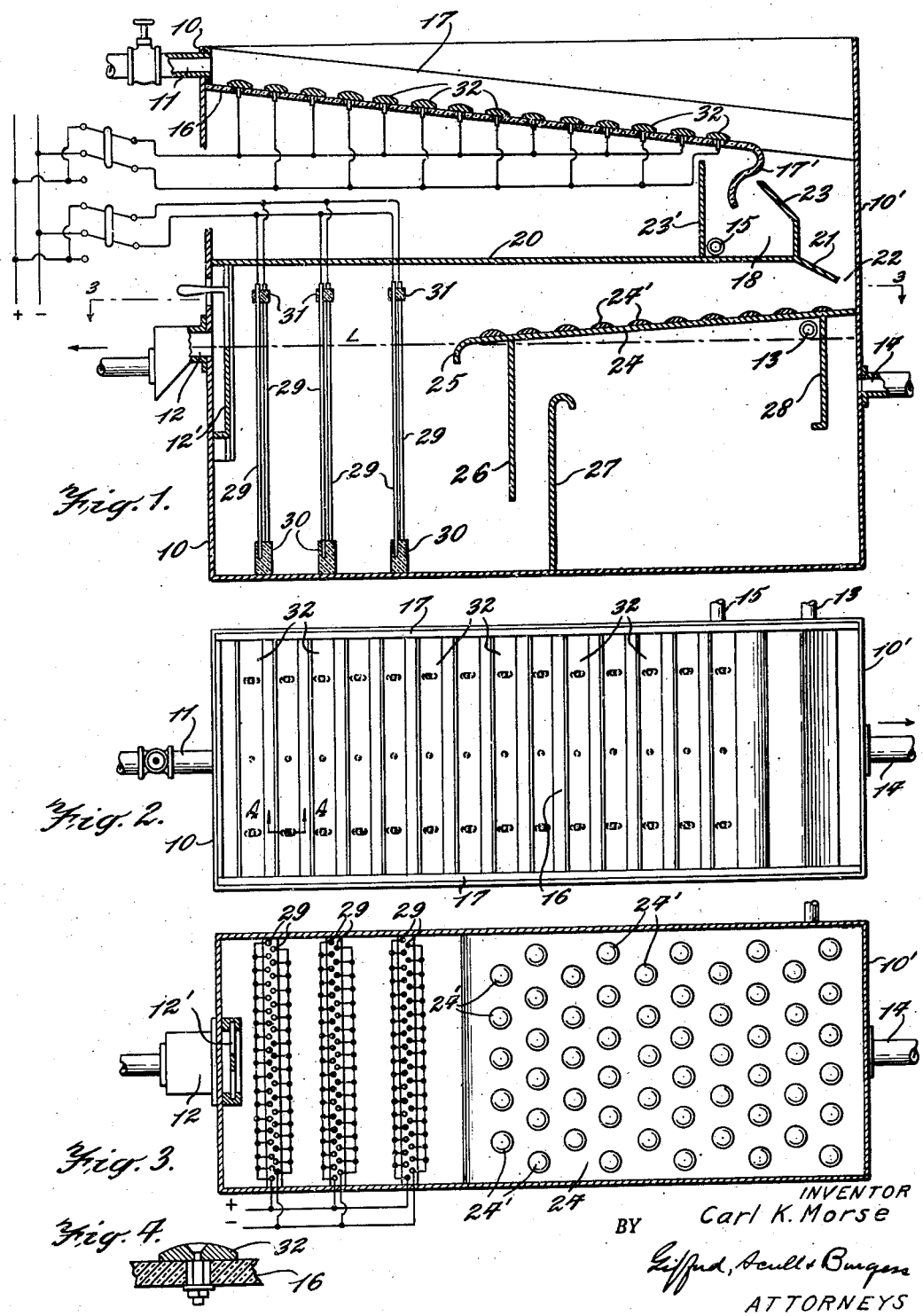

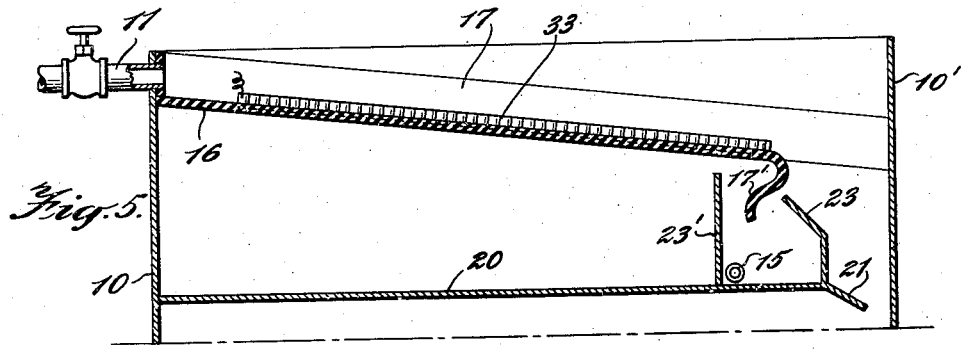
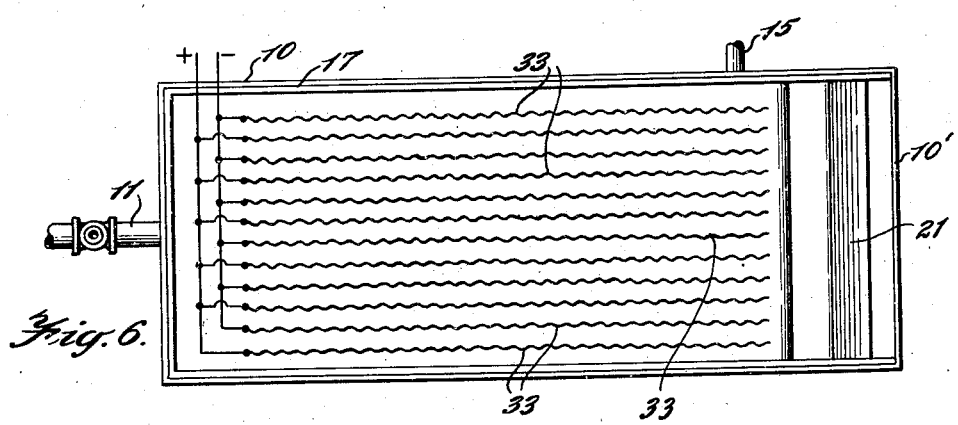
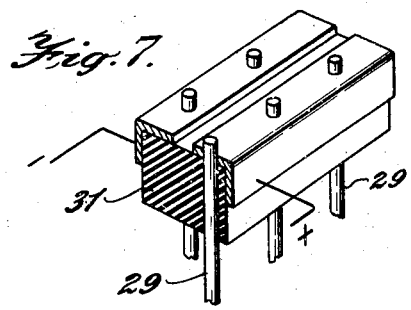

2,478,934

UNITED STATES PATENT OFFICE 2,478,934

ELECTRIC APPARATUS FOR SEPARATING OILS FROM MIXTURES

Carl K. Morse, Plainfield, N. J., assignor to Eleanor H. Morse, Plainfield, N. J.

Application March 13, 1942, Serial No. 434,545

5 Claims. (Cl. 204—299)

My invention relates to oil separators and to de-emulsification, dehydration, and oil separating processes.

The object of my invention is to provide an improved means and process for separating oil from mixtures which may contain, in addition to the oil, water, tars and solids, and particularly from mixtures in which the oil forms an emulsion with water and may not be removed readily by mechanical separators.

In order to de-emulsify and separate oils and effluents from such mixtures, I employ an electrified riffleboard or equivalent device, separately, or together with an electrified device hereinafter referred to as a screen, and a tar trap when required by the nature of the emulsion to be treated.

Referring to the drawings which form a part of these specifications:

Fig. 1 is a longitudinal sectional view of an apparatus embodying my invention, as it may be arranged for separating the tar or wax-like contents from the oil in a sludge mixture from a gas plant;

Fig. 2 is a plan view of the construction shown in Fig. 1;

Fig. 3 is a plan view of the lower table, and of the electrical screens located below the upper table.

Fig. 4 is a sectional view of an arrangement which may be used for fastening and holding the electrified riffle plates of Fig. 1 to the table, said view being taken on line 4—4 of Fig. 2;

Fig. 5 is a longitudinal sectional view of another form of riffle-board wherein the riffles are formed of spaced corrugated sheets of metal or other suitable material, held onto a table of insulating material;

Fig. 6 is a plan view of the construction shown in Fig. 5;

Fig. 7 is a perspective view of a portion of a screen, showing one form of construction used to support vertically extending rods which are electrically charged.

In the arrangement shown in Figs. 1 to 4, inclusive, 10 is a tank of metal or other suitable material provided with a valve controlled inlet 11 for the mixture to be treated and having oil outlets 12 and 13, a water outlet 14 and a tar or wax products outlet 15. Held within the tank 10 at the upper part thereof is a trough or conduit 16 of insulating material provided with side walls 17, the bottom of the trough being positioned to form an inclined table, the upper end of which is located below the inlet 11 and the lower end of which extends to near the edge of the tank wall 10'. The lower end of the trough is shaped to provide a curved depending portion 17' which is located above a chamber 18. The bottom of the chamber 18 is formed by the plate 20, the end of the plate 21 being bent downward and spaced from the wall 10' to form a passage 22. The chamber 18 is formed by the upwardly extending walls 23 and 23'.

Extending to the left of Fig. 1 from the wall 10' is another plate or table 24 which may be provided with projections 24' for a purpose to be hereinafter referred to. The end 25 of the plate 24 is curved downwardly so that its lower end is located below the lower side of both of the oil outlets. A baffle 26 extends downwardly from the lower side of the plate 24 and a baffle 27 extends upwardly from the bottom of the tank and is positioned to form a space between it and the baffle 26. Another baffle 28 extends downwardly from the plate 24 below the top of the baffle 27 and in front of the water outlet 14.

The oil outlet 12 is provided with a gate 12' which may be raised or lowered in relation to the outlet opening 12 by means of the handle shown, whereby the level of the oil passing to the outlet 12 may be regulated.

At the left-hand side of the tank formed by the bottoms and sides of the tank and the plate 20 are positioned separating screens comprising spaced vertical rods 29 supported in insulating bars 30, 31, there being as many sets of such vertical rods as may be desired.

On the table 16 there is a plurality of spaced bars 32 which may be conveniently attached to the plate 16 as shown in Fig. 4. Alternate bars 32 are connected respectively to opposite sides of an electric current supply, the current being direct in this example. Preferably a switch is provided by which the polarity of the bars 32 may be reversed. Similarly, alternate rods 29 are connected to the source of current supply, a suitable switch preferably being provided to reverse the polarity of the rods.

For the purpose for which this particular embodiment is intended, the cross bars or riffles 32 may be from ⅜ to ½ inch high above the surface of the table 16, their width may be about 2 inches and their adjacent edges may be spaced apart from ½ to ¾ of an inch. The inlet valve will be regulated so that the flow of the mixture over the riffles will be about ⅛ to ¼ of an inch. The voltage of the current supplied to the riffles 32 may be varied to suit conditions but I have found that 750 volts of direct current is suitable in most cases. The same voltage may be used for the rods 29. These rods may be separated any desired distance but I have found that ¼ of an inch is satisfactory.

In operation, the mixture flows downwardly across the riffles 32. Because the mixture has a relatively high resistance, a relatively small current passes between alternate riffles but I have found that it causes a change in the mixture such that there is a relatively rapid breaking-up of oil emulsions and a separation of the materials of the mixtures according to their specific gravities, probably caused by ionization of the oil in the emulsion. As a result, by the time any particular portion of the mixture reaches the lower right-hand end of the table 16, the tarry materials with the solids will be at the bottom, the water above it and the oil floating on the water. It will be understood, of course, that the separation just referred to is not complete but it is sufficient to cause the greater portion of the tarry material to cling to and flow around the curved end 17' into the chamber 18, from which it may be drawn through the outlet 15. The water and the oil pass across the opening between the plate 23 and the end 17' and thence through the opening 22 on to the table 24. I have provided this table because I find that, by passing the mixture of water and oil over the projections 24' on this table, there is a relatively rapid segregation of the liquids of different specific gravities.

In the arrangement shown in Fig. 1, the gate 12' can be adjusted so that the level of the oil and water in the lower part of the tank 10 will be just above the line L—L. As the oil and water pass over the edge 25, there will be a gravity separation so that, without more, the oil would pass directly to the outlet 12 while the water would find its way under the baffle 26 and over the baffle 27 and under the baffle 28 to the water outlet 14.

To insure a more complete separation of the oil and water, I have provided the screens formed of the rods 29. As the water and oil mixture passes between these rods, they are subjected to the current which may pass through the mixture between alternate bars and this insures more perfect separation of oil and water.

I have found that, in the arrangement shown in Fig. 1, solids and tar in the mixture tend to collect between the riffles and ultimately to short circuit, to some extent, the current between the riffles. I have found that, when direct current is used, the changing of the direction of flow of the current from time to time, say every three minutes and the corresponding change of polarity in the riffles, will largely prevent this building-up of solids between the riffles. This reversal of polarity of the riffles causes the tar or wax to be released from a surface to which it has been attracted and to flow to the next lower bar.

What I have just said applies also to the rods 29, the reversal of the polarity tending to cause any solids which may have become attached to the rods to separate therefrom and fall to the bottom of the tank 10.

In Figs. 5 and 6, I have shown an alternate form of riffle-board which may be used in place of that shown in Fig. 1. In this case, the riffles are formed of corrugated plates 33 standing on edge and extending in the direction of flow of the mixture. These corrugated plates may be spaced apart about the same distance as the rods 29 though such distance will be varied according to the conditions and particularly of the material being treated. It will be obvious that the riffles form a series of parallel conduits with undulating or sinuous walls. The same electric current may be used as in the arrangement of Fig. 1, the plates being held in grooves in the insulating plate 16 and connected alternately to the source of current supply, as shown.

In the arrangement shown in Figs. 5 and 6, the flow of the mixture will be regulated so that it will not be higher than the upper edges of the plates 33. In this arrangement, the mixture is subjected to the current as it flows from one end to the other of the table, the corrugations insuring that there will be turbulence in the flow so that each particle of the mixture will be brought, at some time, into more or less intimate contact with one of the plates. If the solids tend to adhere to these plates, and particularly in the recesses of the corrugations, they may be released by changing the polarity of the walls in the manner indicated in Fig. 1.

While I have illustrated the use of direct current, an alternating current may be used with my invention and the length of the passage of the mixtures will be arranged according to the conditions, it being obvious that the longer the path the more certainly parts of the mixture will have been treated before the separate components have reached their respective outlets.

I claim:

1. Apparatus for the purpose described, comprising a gravity-flow conduit including a portion in the form of a table downwardly inclined from the inlet toward the outlet end of the conduit, said table being of insulating material, a plurality of closely spaced conductor members mounted thereon and adapted to produce a slight wave or sinuous motion to liquid flowing over the table portion, adjacent conductor members being connected respectively to opposite sides of an electric current supply, said conduit also including a reversely curved depending portion beyond the lower end of the table, a chamber located to receive fluid conducted thereto by said curved portion and baffle means to intercept the balance of the flow from the lower end of the table.

2. Apparatus for the purpose described, comprising a gravity-flow conduit including a portion in the form of a table downwardly inclined from the inlet toward the outlet end of the conduit, said table being of insulating material, a plurality of closely spaced conductor members mounted thereon and adapted to produce a slight wave or sinuous motion to liquid flowing over the table, adjacent conductor members being connected respectively to opposite sides of an electric current supply, and means beyond the said conductor members for separating the fluid immediately adjacent the conduit surface from the balance of the flow.

3. Apparatus for the purpose described, comprising a gravity-flow conduit including a portion in the form of a table downwardly inclined from the inlet toward the outlet end of the conduit, a plurality of closely spaced conductor members mounted thereon and adapted to produce a slight wave or sinuous motion to liquid flowing over the table portion, adjacent conductor members being electrically insulated from each other and connected to opposite sides of an electric current supply, said conduit also including a reversely curved depending portion beyond the lower end of the table, a chamber located to receive fluid conducted thereto by said curved portion and baffle means to intercept the balance of the flow from the lower end of the table.

4. Apparatus for the purpose described, comprising a gravity-flow conduit including a portion in the form of a table downwardly inclined from the inlet toward the outlet end of the conduit, a plurality of transversely arranged, closely spaced conductor members mounted thereon and adapted to produce a slight wave or sinuous motion to liquid flowing over the table portion, adjacent conductor members being electrically insulated from each other and connected to opposite sides of an electric current supply, said conduit also including a reversely curved depending portion beyond the lower end of the table, a chamber located to receive fluid conducted thereto by said curved portion and baffle means to intercept the balance of the flow from the lower end of the table.

5. Apparatus for the purpose described, comprising a gravity-flow conduit including a portion in the form of a table downwardly inclined from the inlet toward the outlet end of the conduit, a plurality of closely spaced, longitudinally arranged conductor members forming a plurality of sinuous channels, adjacent conductor members being electrically insulated from each other and connected to opposite sides of an electric current supply, said conduit also including a reversely curved depending portion beyond the lower end of the table, a chamber located to receive fluid conducted thereto by said curved portion and baffle means to intercept the balance of the flow from the lower end of the table.

CARL K. MORSE.

REFERENCES CITED

The following references are of record in the file of this patent:

UNITED STATES PATENTS

| Number | Name | Date |
| --- | --- | --- |
| 744,171 | Davis et al. | Nov. 17, 1903 |
| 1,290,369 | Seibert et al. | Jan. 7, 1919 |
| 1,405,129 | Harris | Jan. 31, 1922 |
| 1,477,088 | Turner | Dec. 11, 1923 |
| 1,540,929 | Coblentz et al. | June 9, 1925 |
| 1,555,231 | Skaer | Sept. 29, 1925 |
| 1,591,472 | Debrey | July 6, 1926 |
| 1,702,612 | Morse | Feb. 19, 1929 |
| 1,783,471 | Herbsman | Dec. 2, 1930 |
| 1,804,743 | Cannon | May 12, 1931 |
| 1,838,927 | Fisher | Dec. 29, 1931 |
| 1,845,366 | Tiller | Feb. 16, 1932 |
| 2,116,509 | Cottrell | May 10, 1938 |
| 2,163,804 | Passler | June 27, 1939 |
| 2,261,108 | Dillon et al. | Nov. 4, 1941 |

FOREIGN PATENTS

| Number | Country | Date |
| --- | --- | --- |
| 7,126 | Great Britain | 1885 |
| 4,836 | Great Britain | 1908 |
| 302,941 | Great Britain | 1929 |
| 579,497 | Germany | June 27, 1933 |
| 261,076 | Germany | June 13, 1913 |